United States Patent
Josserand et al.

(10) Patent No.: US 9,719,689 B2
(45) Date of Patent: Aug. 1, 2017

(54) ADVANCED AIR TERMINAL

(75) Inventors: Olivier Josserand, La Boisse (FR); Patrick Renault, Lyons (FR); Jacques René Schmid, Soisy-sur-Seine (FR)

(73) Assignee: CARRIER CORPORATION, Farmington, CT (US)

( * ) Notice: Subject to any disclaimer, the term of this patent is extended or adjusted under 35 U.S.C. 154(b) by 799 days.

(21) Appl. No.: 14/110,253

(22) PCT Filed: Apr. 8, 2011

(86) PCT No.: PCT/IB2011/001435
§ 371 (c)(1),
(2), (4) Date: Jul. 9, 2014

(87) PCT Pub. No.: WO2012/137030
PCT Pub. Date: Oct. 11, 2012

(65) Prior Publication Data
US 2015/0176909 A1   Jun. 25, 2015

(51) Int. Cl.
*F24F 7/10* (2006.01)
*F24F 1/00* (2011.01)
(Continued)

(52) U.S. Cl.
CPC ............. *F24F 7/10* (2013.01); *F24F 1/0007* (2013.01); *F24F 11/0017* (2013.01); *F28D 1/02* (2013.01);
(Continued)

(58) Field of Classification Search
CPC ................. F24F 7/10; F24F 2001/0037; F24F 2001/0051; F24F 11/0017; F24F 1/0007; F28F 27/00; F28D 1/02
See application file for complete search history.

(56) References Cited

U.S. PATENT DOCUMENTS 5,976,010 A * 11/1999 Reese .................. F24F 11/0017
454/229
6,874,334 B2 * 4/2005 Kim ...................... F24F 1/0007
62/412
(Continued)

FOREIGN PATENT DOCUMENTS

CN      1478969       3/2004
CN   100356114 A      8/2005
(Continued)

OTHER PUBLICATIONS

Chinese Office Action; International Application No. 201180070263.4; Filed Apr. 8, 2011; mailed Aug. 17, 2015; 5 pages.
(Continued)

*Primary Examiner* — Devon Russell
(74) *Attorney, Agent, or Firm* — Cantor Colburn LLP

(57) ABSTRACT

An air conditioning system includes a climatic beam located in a room. The climatic beam includes a first portion and a second portion, and a divider located along a length of the climatic beam to separate the first portion from the second portion. The climatic beam further includes a coil supplied with a flow of fluid. A fresh air duct is connected to the first portion to provide a flow of fresh air into the first portion, and a fan is located at the second portion and is configured to draw a flow of primary air across the coil and into the second portion. A beam exit allows a flow of the fresh air and the primary air into the room.

19 Claims, 4 Drawing Sheets

(51) Int. Cl.
*F28D 1/02* (2006.01)
*F28F 27/00* (2006.01)
*F24F 11/00* (2006.01)

(52) U.S. Cl.
CPC ........... *F28F 27/00* (2013.01); *F24F 11/0012* (2013.01); *F24F 2001/0051* (2013.01); *F24F 2011/0002* (2013.01); *F24F 2011/0026* (2013.01); *Y02B 30/78* (2013.01)

(56) References Cited

U.S. PATENT DOCUMENTS

| | | | |
|---|---|---|---|
| 2003/0042010 A1* | 3/2003 | Kobayashi | F24F 1/027 165/122 |
| 2008/0047697 A1* | 2/2008 | Lee | F24F 1/0007 165/122 |
| 2010/0242726 A1* | 9/2010 | Enbom | F24F 1/01 95/58 |
| 2012/0118535 A1* | 5/2012 | Williams | F24F 1/01 165/104.14 |
| 2012/0222851 A1* | 9/2012 | Arinez | F24F 13/12 165/247 |

FOREIGN PATENT DOCUMENTS

| | | | | |
|---|---|---|---|---|
| CN | 101031756 A | | 9/2007 | |
| CN | 201032227 | | 3/2008 | |
| DE | 19834269 A1 | * | 2/2000 | ........... F24F 1/0007 |
| DE | 102005038199 A1 | | 3/2006 | |
| DE | 1947398 A1 | * | 7/2008 | ........... F24F 1/0007 |
| EP | 1484558 A1 | | 12/2004 | |
| EP | 1559963 A1 | | 3/2005 | |
| FI | 2961294 A1 | * | 12/2011 | ........... F24F 1/0011 |
| FI | CA 2818444 A1 | * | 5/2012 | ............... A61L 9/20 |
| GB | 1310349 A | | 3/1973 | |
| JP | WO 0022355 A1 | * | 4/2000 | ........... F24F 1/0007 |
| KR | 1484558 A1 | * | 12/2004 | ........... F24F 1/0007 |
| KR | 1559963 A1 | * | 8/2005 | ........... F24F 3/1603 |
| SE | WO 0045094 A1 | * | 8/2000 | ......... F24F 1/10007 |
| WO | 8903006 A1 | | 4/1989 | |
| WO | 2009087096 A1 | | 7/2009 | |

OTHER PUBLICATIONS

International Search Report; International Application No. 201180070263.4; Mailed Aug. 4, 2015; Filed Apr. 8, 2011; 3 pages.
State Intellectual Property Office, P.R. China: Second Office Action; Application No. 201180070263.4; Mailing Date: Mar. 11, 2016; 3 pages.

* cited by examiner

ADVANCED AIR TERMINAL

BACKGROUND OF THE INVENTION

The subject matter disclosed herein relates to air conditioning systems. More specifically, the subject disclosure relates to climatic beam air conditioning systems.

A typical climatic beam system includes one or more heat pumps and/or chillers along with a hot water producing apparatus, such as a boiler. This combination allows for cold and/or hot water production for usage by the system depending on room requirements for cooling or heating. Cold and/or hot water are fed to a coil of a climatic beam, depending on these heating or cooling requirements. One or more air handling units are included which draw fresh air to the climatic beam flowing the fresh air across the coil and heating or cooling the air, depending on a temperature of the water in the coil. The treated fresh air proceeds into the room, setting up an induction cycle where ambient air from the room is urged past the coil, and recirculated into the room. Traditional climatic beam systems use fixed airflow for both fresh air flow and room temperature control (cooling or heating). When the room is unoccupied, and the climatic beam system is operating in an unoccupied mode, the air handling unit runs to manage the room temperature when the room temperature is out of the defined dead band.

In a typical climatic beam, however, cold water has to be carefully managed to avoid condensation depending on ambient air temperature and relative humidity. Further, the climatic beam does not filter the ambient room air reentering the system, so air quality is only improved through the introduction of fresh air. A carbon dioxide detector can be located at an inlet grill of the climatic beam to measure the carbon dioxide content of ambient air reentering the system. This has the advantage of reducing introduction of fresh air into the system when the room is not in use to save energy. Especially in heating mode, though, the measurements provided by the carbon dioxide detector may not be an accurate representation of an amount of carbon dioxide in the room due to stratification effects.

BRIEF DESCRIPTION OF THE INVENTION

According to one aspect of the invention, an air conditioning system includes a climatic beam located in a room. The climatic beam includes a first portion and a second portion, and a divider located along a length of the climatic beam to separate the first portion from the second portion. The climatic beam further includes a coil supplied with a flow of fluid. A fresh air duct is connected to the first portion to provide a flow of fresh air into the first portion, and a fan is located at the second portion and is configured to draw a flow of primary air across the coil and into the second portion. A beam exit allows a flow of the fresh air and the primary air into the room.

According to another aspect of the invention, a method of conditioning air in a room includes urging a flow of fresh air into a first portion of a climatic beam. The method further includes rotating a fan located at the climatic beam and urging a flow of primary air from a room across a coil of the climatic beam, containing a volume of fluid at a desired temperature, via rotation of the fan. Thermal energy is transferred between the flow of primary air to heat or cool the primary air. The flow of primary air is urged into a second portion of the climatic beam, the first portion and the second portion separated by a divider positioned along a length of the climatic beam. The primary air and the fresh air are then flowed into the room.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
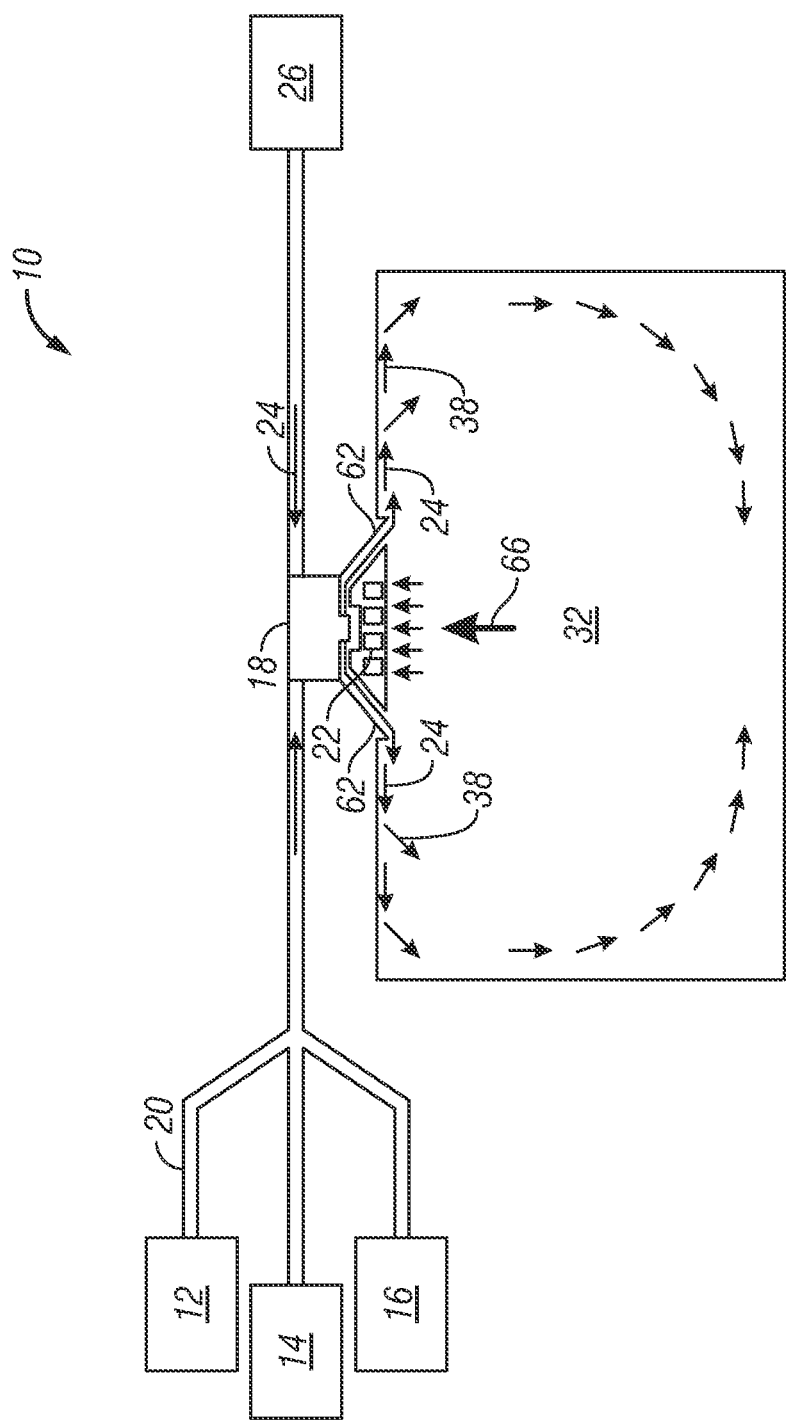
FIG. 1 is a schematic view of an embodiment of an air conditioning system.

Shown in FIG. 1 is an embodiment of a climatic beam air conditioning system 10. The air conditioning system 10 may be utilized for increasing and/or decreasing a temperature of an interior space, for example, a room 32, and includes one or more apparatus for the production of cold and hot water. For example, the system may utilize heat pumps 12 which can produce hot and cold water, and/or the system may include one or more chillers 14 for production of cold water and one or more hot water production apparatus', such as a boiler 16. This combination allows for cold and/or hot water production for usage by the system depending on requirements for cooling or heating.

A climatic beam 18 is connected to the heat pumps 12, chillers 14, boiler 16, or the like via at least one water conduit 20. A coil 22 is located in the climatic beam 18 and connected to the water conduit 20 to allow for circulation of the water from the conduit 20 through the coil 22.

Figure 2:
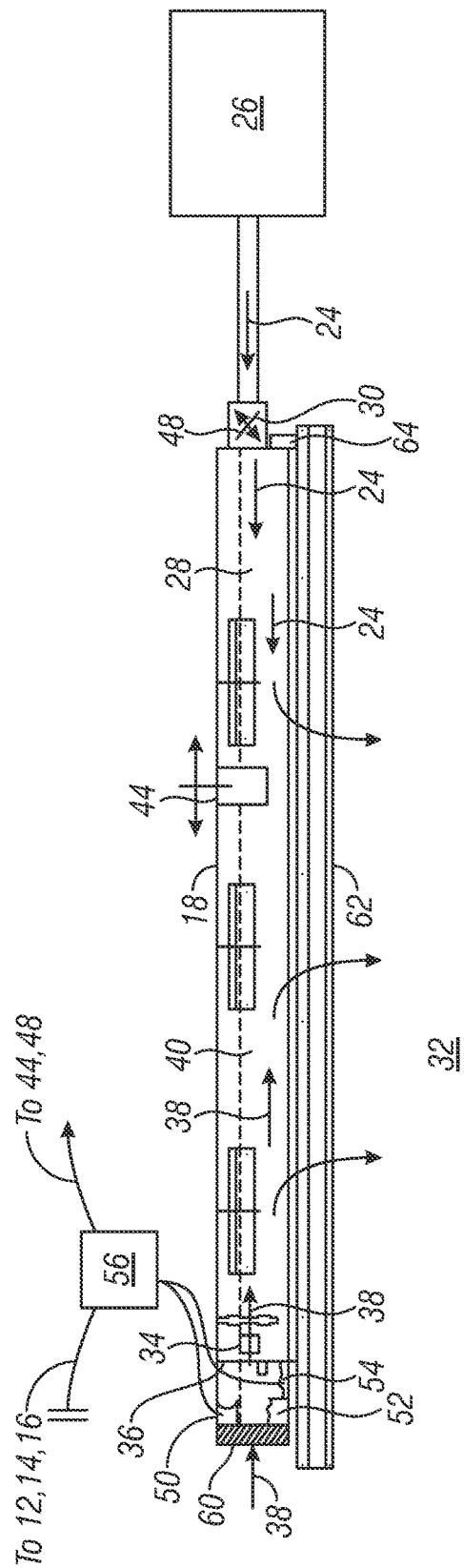
FIG. 2 is a lengthwise cross-sectional view of an embodiment of an air conditioning system.

A flow of fresh air 24 is urged to the climatic beam 18 via one or more air handling units 26. Referring now to FIG. 2, the fresh air 24 enters a fresh air chamber 28 of the climatic beam 18 via a fresh air duct 30, which in some embodiments is located at a first end 64 of the climatic beam. The fresh air 24 flows into the room 32 and induces a flow of return air 66 into the climatic beam 18. In some embodiments, a fan 34 is located at a second end 36 of the climatic beam 18 and, when operated, aids in drawing the flow of return air 66 from the room 32 across the coil 22 (shown in FIG. 1) and into a primary air chamber 40 of the climatic beam 18, thus raising or lowering a temperature of the return air 66 depending on a temperature of the water in the coil 22 in response to heating or cooling requirements of the room 32. In some embodiments, the fan 34 is a variable speed fan to enable better control of both comfort and energy management. A filter 60 is located upstream of the fan 34 to filter the return air 66 entering the primary air chamber 40. The fresh air chamber 28 and the primary air chamber 40 are separated by a divider located in the climatic beam 18. In some embodiments, the divider is a shutter 44 which is movable along a length of the climatic beam 18, thereby changing a size of the primary air chamber 40 and the fresh air chamber 38. Variation in the mixing of fresh air 24 and return air 66 allows for providing varying desired amounts of fresh air, for preventing carbon dioxide buildup, and return airflow, for managing the temperature of the room 32. In other embodiments, the divider may be another device, such as a check valve disposed between the fresh air chamber 38 and the primary air chamber 40. The return air 66 is then mixed with the fresh air 24 and flowed into the room 32 as a flow of primary air 38 via a beam exit 62.

The flow of primary air 38 and the flow of fresh air 24 are both adjustable in the climatic beam 18 of the present disclosure. First, the speed of rotation of the fan 34 controls a mass flow rate of return air 66 into the primary air chamber 40. Second, in some embodiments, a damper 48 is located in the fresh air duct 30. The position of the damper 48 in the fresh air duct 30 regulates the flow of fresh air 24 through the fresh air duct 30. With the damper 48 in a full open position, the flow of fresh air 24 through the fresh air duct 30 is maximized, and when the damper 48 is in a full closed position, the flow of fresh air 24 can be completely shut off. Further, the location of the shutter 44 in the climatic beam 18 between the fresh air chamber 28 and the primary air chamber 40 controls a proportion of fresh air 24 to return air 66 that enters the climatic beam 18 and is flowed into the room 32.

Tuning of the primary air 38 avoids the stratification effect of the prior art. Stratification might be avoided, for example, by having a maximum airflow (primary and return) blown into the room 32 and also by adjustment of the coil 22 temperature. If coil 22 temperature in heating is reduced to a minimum, the stratification effect may be minimized. Tuning of the flow of fresh air 24 allows for control of carbon dioxide levels in the room 32. For example, when the room 32 is occupied over a period of time, carbon dioxide levels will rise if the primary air 38 is not supplemented with an adequate flow of fresh air 24. One the other hand, keeping a flow of fresh air 24 at a constant high level requires large air handling units 26, large fresh air ducts 30. By tuning the fresh air 24 such that fresh air 24 is supplied only as needed, allows for reduction in size of the air handling units 26 and fresh air ducts 30, compared to other climatic beam 18 systems.

Control of the tuning mechanisms may be achieved via the use of a carbon dioxide sensor 50 and/or a temperature sensor 52. In this system, the carbon dioxide sensor 50 and the temperature sensor 52 may be installed directly in a return air portion 54 of the climatic beam 18, upstream of the fan 34. It is possible due to avoidance of the stratification effects in the primary air 38, thus the carbon dioxide sensor 50 and temperature sensor 52 will measure values which accurately represent conditions in the room 32. Installation of the temperature sensor 52 and the carbon dioxide sensor 50 in the climatic beam 18 instead of installed in the room 32, as would be required in the prior art, simplifies installation of the air conditioning system 10 such that there is no need to run wiring for the carbon dioxide sensor 50 and temperature sensor 52 from the climatic beam 18 to location in the room 32. Positioning the carbon dioxide sensor 50 directly in the return air portion 54 also allows for a layout of the room 32 to be changed without having to remove carbon dioxide sensors 50 from a wall.

The carbon dioxide sensor 50 and the temperature sensor 52 are linked to a controller 56. The controller 56 uses information from the temperature sensor 52 to direct input to the coil 22 from the heat pumps 12, chillers 14, and/or boiler 16 to set a temperature of the water in the coil 22 to heat or cool the room 32. The controller 56 utilizes data from the carbon dioxide sensor 50 to adjust the damper 48 position in the fresh air duct 30 and/or the position of the shutter 44 in the climatic beam 18 to regulate the rate of fresh air 24 into the room 32 to ensure the levels of carbon dioxide in the room 32 do not exceed a desired level.

Further, the controller 56 can be utilized to increase or decrease flow of primary air 38 via the fan 34. For example, when an outside temperature goes against a load required by the air conditioning system 10, such as a hot summer night when cooling of the room 32 is desired, or a cold winter night when heating of the room 32 is desired. In such cases, the fan 34 is utilized to increase flow of primary air through the system 10 and across the coil 22 to cool or heat the room 32 as desired while the room 32 is unoccupied during, for example, early morning hours. The heating or cooling can be accelerated by limiting or stopping the flow of fresh air 24 by closing the damper 48. Closing of the damper 48 during such operation will not adversely effect carbon dioxide levels in the room 32 at such times when the room is unoccupied. Thus, the system 10 reduces energy usage by avoiding operation of the air handling units 26, which prevents energy loss through pressure drop in the system 10 ducts.

Conversely, during weather conditions where the outdoor temperature can adequately correct the indoor temperature, the fan 34 can be turned off and the damper 48 opened to increase the flow of fresh air 24 to effectively control the temperature of the room 32 without needing to activate the heat pumps 12, chillers 14, and/or boiler 16 to assist in temperature control.

Figure 3:
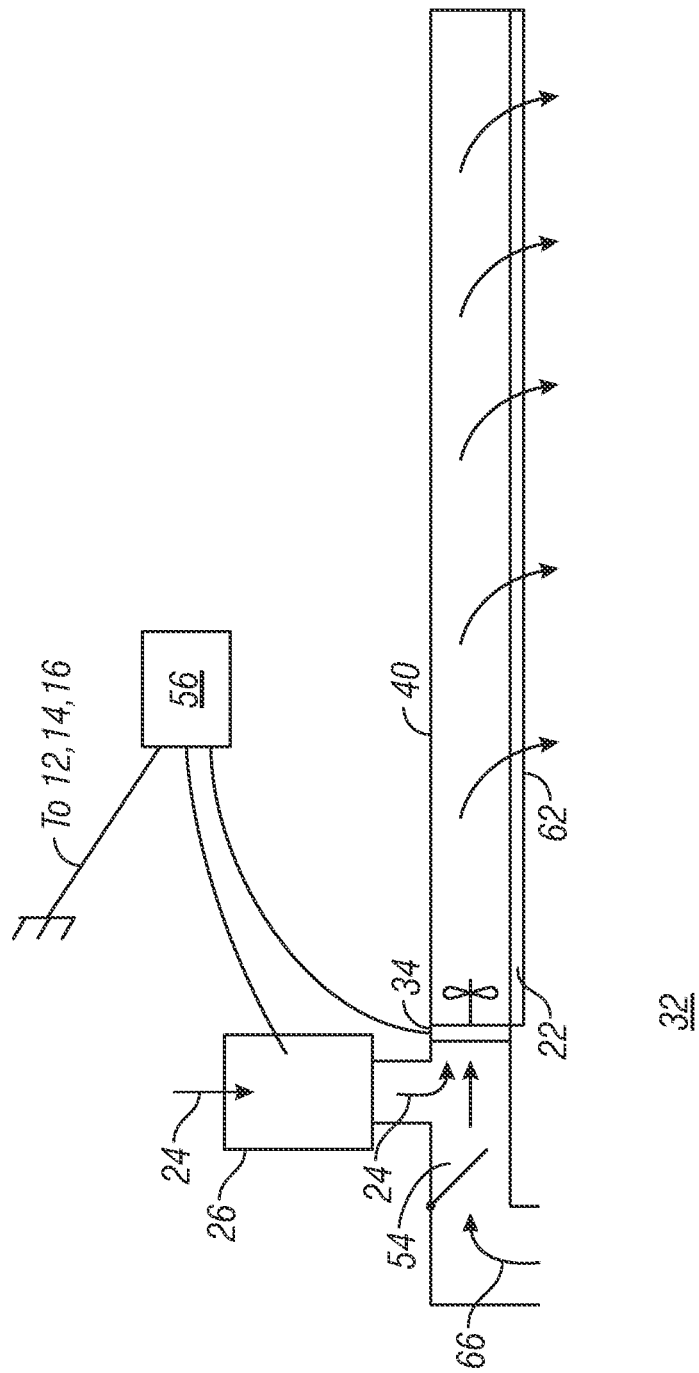
FIG. 3 is a schematic view of another embodiment of an air conditioning system.

In other embodiments, such as shown in FIG. 3, the air handling unit 26 and the fan 34 are located at a same end of the climatic beam 18, with the air handling unit 26 located upstream of the fan 34. In this embodiment, the fan 34 urges a flow of return air 66 into return air portion 54 where it mixes with a flow of fresh air 24 urged into the return air portion 54 by the air handling unit 26. The mixed return air 66 and the fresh air 24 is urged into the primary air chamber 40 by the fan 34. The mixture is conditioned by flowing across the coil 22 and enters the room 32 via the beam exit 62.

Figure 4:
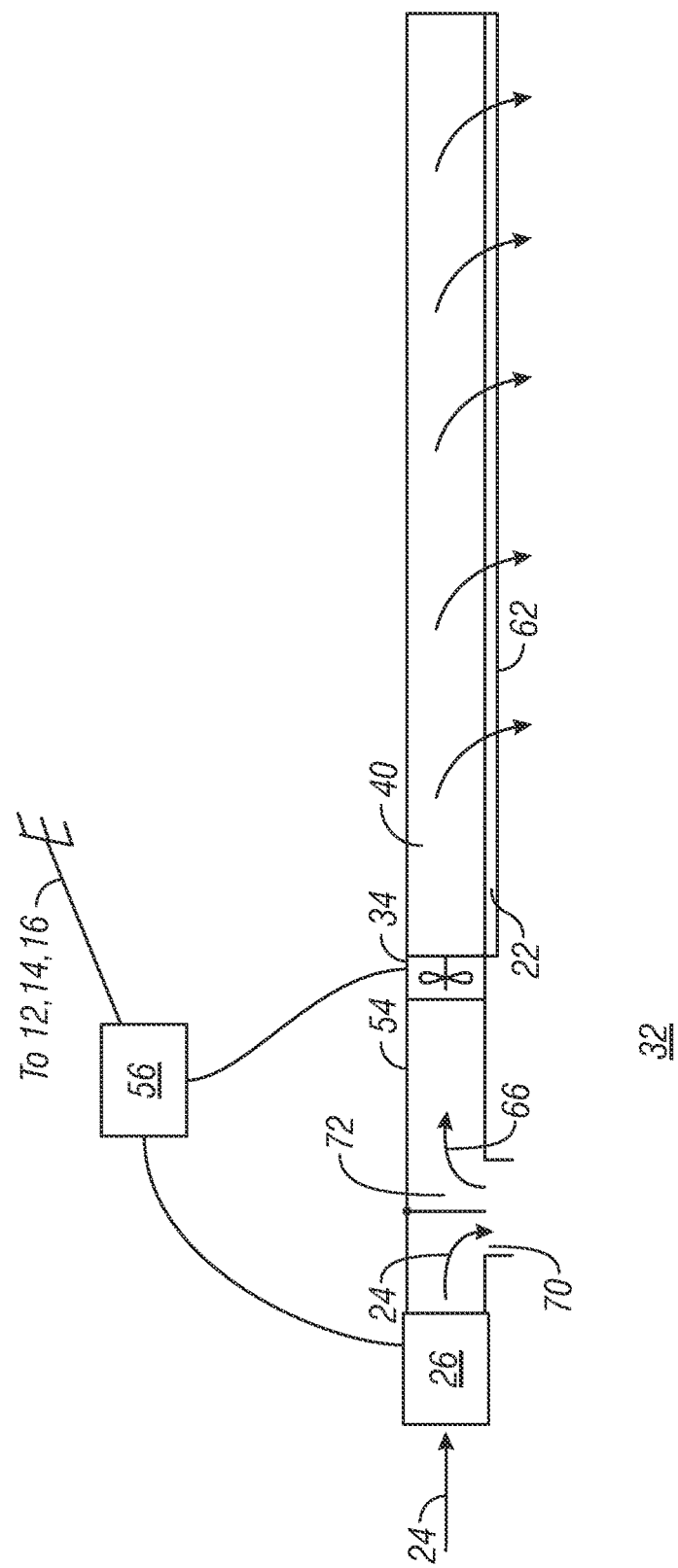
FIG. 4 is a schematic view of yet another embodiment of an air conditioning system.

In another embodiment, as shown in FIG. 4, the return air flow 66 and the fresh air 24 air entirely separated from each other. The fresh air 24 flows from the air handling unit 26 into the room 32 via a fresh air opening 70, while the return air 66 enters the system 10 via a return air opening 72. The return air 66 circulates through the climatic beam 18 where it is conditioned by flowing across the coil 22, and re-enters the room 32 at the beam exit 62 which is separate and distinct from the fresh air opening 72.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air conditioning system including:
   a climatic beam disposed in a room, the climatic beam including:
      a fresh air chamber;
      a primary air chamber;
      a divider disposed along a length of the climatic beam to separate the fresh air chamber from the primary air chamber, wherein the divider is a shutter movable along a length of the climatic beam to change a size of the fresh air chamber and the primary air chamber; and
      a coil supplied with a flow of fluid;
   a fresh air duct connected to the fresh air chamber to provide a flow of fresh air thereinto;
   a fan disposed at the primary air chamber configured to draw a flow of primary air across the coil and into the second portion; and
   a beam exit to flow the fresh air and the primary air into the room.

2. The air conditioning system of claim 1, further comprising one or more heat pumps, chillers, and/or boilers operably connected to the coil to supply the coil with a fluid of a desired temperature.

3. The air conditioning system of claim 1, further comprising one or more air handling units operably connected to the fresh air duct to supply fresh air thereto.

4. The air conditioning system of claim 1, further comprising a damper to control a flow of fresh air into the fresh air chamber.

5. The air conditioning system of claim 4, wherein the damper is disposed at the fresh air duct.

6. The air conditioning system of claim 4, wherein the damper is closeable to stop the flow of fresh air into the fresh air chamber.

7. The air conditioning system of claim 1, wherein the fan is stoppable to stop the flow of primary air across the coil and into the primary air chamber.

8. The air conditioning system of claim 1 including a carbon dioxide sensor and/or a temperature sensor to determine a makeup of the flow through the beam exit.

9. The air conditioning system of claim 8, wherein the carbon dioxide sensor and/or the temperature sensor are installed in a return air portion of the climatic beam.

10. A method of conditioning air in a room comprising:
    urging a flow of fresh air into a fresh air chamber of a climatic beam;
    rotating a fan disposed at the climatic beam;
    urging a flow of primary air from a room across a coil of the climatic beam via rotation of the fan, the coil containing a volume of fluid at a desired temperature;
    transferring thermal energy between the flow of primary air to heat or cool the primary air;
    urging the flow of primary air into a primary air chamber of the climatic beam, the fresh air chamber and the primary air chamber separated by a divider positioned along a length of the climatic beam, the divider a shutter movable along a length of the climatic beam to change a size of the fresh air chamber and the primary air chamber; and
    flowing the primary air and fresh air into the room.

11. The method of claim 10, further comprising changing a position of a damper to control the flow of fresh air into the fresh air chamber.

12. The method of claim 11, further comprising fully closing the damper to stop the flow of fresh air into the fresh air chamber.

13. The method of claim 10, further comprising changing a speed of the fan to control the flow of primary air into the primary air chamber.

14. The method of claim 13, further comprising stopping rotation of the fan to stop the flow of primary air into the primary air chamber.

15. The method of claim 10, further comprising adjusting a composition of the primary air and fresh air into the room based on a sensed level of carbon dioxide in the primary air.

16. The method of claim 15, wherein increasing the flow of fresh air reduces the level of carbon dioxide.

17. The method of claim 10, further comprising adjusting a composition of the primary air and fresh air flowed into the room based on a sensed temperature of the primary air.

18. The method of claim 10, further comprising adjusting the temperature of fluid in the coil.

19. The method of claim 10, further comprising adjusting a fan speed, thereby adjusting the flow of primary air across the coil.

* * * * *